(12) United States Patent
Dohse et al.

(10) Patent No.: US 8,056,189 B2
(45) Date of Patent: Nov. 15, 2011

(54) PROTECTIVE ELEMENT FOR TEXTILE LASHING OR FIXING MEANS, AND LASHING OR FIXING MEANS PROVIDED WITH ONE SUCH PROTECTIVE ELEMENT

(75) Inventors: Lars Dohse, Aachen (DE); Werner Glasen, Herzogenrath (DE)

(73) Assignee: Spanset Inter AG, Oetwil Am See (CH)

( * ) Notice: Subject to any disclaimer, the term of this patent is extended or adjusted under 35 U.S.C. 154(b) by 875 days.

(21) Appl. No.: 11/575,565

(22) PCT Filed: Sep. 9, 2005

(86) PCT No.: PCT/EP2005/009701
§ 371 (c)(1),
(2), (4) Date: Dec. 11, 2007

(87) PCT Pub. No.: WO2006/032381
PCT Pub. Date: Mar. 30, 2006

(65) Prior Publication Data
US 2008/0256758 A1    Oct. 23, 2008

(30) Foreign Application Priority Data
Sep. 20, 2004   (DE) .......................... 10 2004 045 905

(51) Int. Cl.
*B66C 1/12* (2006.01)
(52) U.S. Cl. ............................................. 24/16 R; 24/1
(58) Field of Classification Search .................. 24/16 R, 24/17 R, 17 AP, 17 B, 17 A, 16 PB, 301, 24/302, 1; 248/499, 500; 206/453; 294/74; 40/305, 316, 640, 632; 410/96, 97, 99
See application file for complete search history.

(56) References Cited

U.S. PATENT DOCUMENTS

| 4,124,244 | A |   | 11/1978 | Bryant |         |
|-----------|---|---|---------|--------|---------|
| 5,367,752 | A | * | 11/1994 | Petty  | 24/301  |
| 5,485,810 | A | * | 1/1996  | Sporn  | 119/792 |

FOREIGN PATENT DOCUMENTS

| DE | 29515832 | 12/1995 |
| EP | 0556452  | 8/1993  |
| EP | 1103652  | 5/2001  |

* cited by examiner

*Primary Examiner* — James Brittain
(74) *Attorney, Agent, or Firm* — Proskauer Rose LLP

(57) ABSTRACT

A protective element for textile lashing or fixing devices for lifting, fixing or lashing objects, comprises a protective layer which is intended for arrangement between the lashing or fixing device and the respective object. The protective element allows the advantages of known protective elements to be used, but at the same time ensures improved force transmission. The intention is also to provide a lashing or fixing device which can apply the forces required for lifting, fixing or lashing an object with more uniform loading across its length. This is achieved in that the protective layer is formed from a textile backing fabric which carries a textile material at least on its surface associated with the lashing or fixing device, the textile material, owing to its shaping, its arrangement and/or its material properties, in the state abutting the lashing or fixing device having different sliding properties to the backing fabric.

13 Claims, 3 Drawing Sheets

Figure 1:
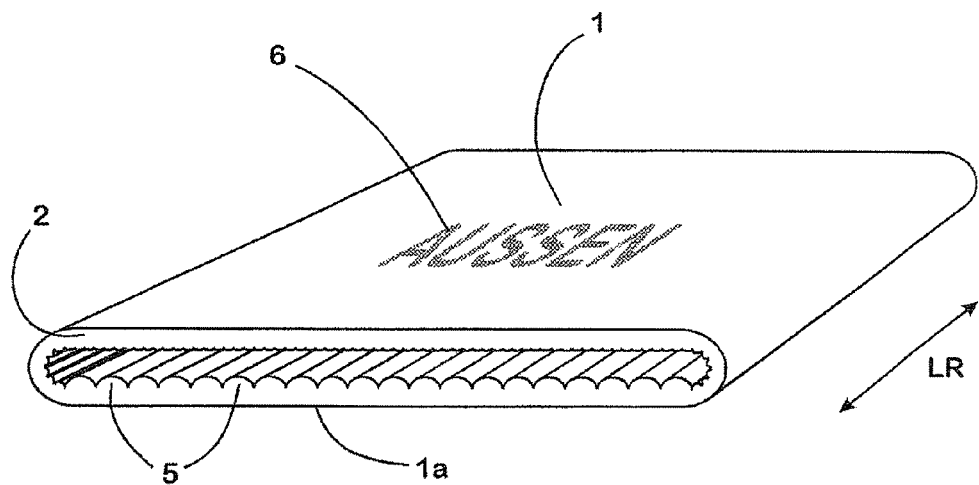

PROTECTIVE ELEMENT FOR TEXTILE LASHING OR FIXING MEANS, AND LASHING OR FIXING MEANS PROVIDED WITH ONE SUCH PROTECTIVE ELEMENT

The invention relates to a protective element for textile lashing or fixing means for lifting, fixing or lashing objects, comprising a protective layer which is intended for arrangement between the lashing or fixing means and the respective object. The invention also relates to lashing or fixing means provided with a protective element of this type.

BACKGROUND OF THE INVENTION

The relevant lashing or fixing means can, for example, be cables, belts or straps which are subject to a tensile force to hold, lift or transport the respective object. Fixing means are used in this case to produce the connection between the load and the lifting or pulling device for example when lifting or moving loads. Lashing means on the other hand are required to secure articles. Lashing means are thus used in particular for load-securing on vehicles.

Irrespective of whether it is used with a lashing means or a fixing means the protective element in each case has the function of preventing damage to the respective lashing or fixing means in the region of the edges or other shaped elements at which the lashing or fixing means are diverted. High surface pressures occur in these regions which in turn lead to high frictional forces and entail the risk of sharp edges of the respective object cutting into the lashing or fixing means.

To protect against instances of damage of this type a protective element with a protective layer is in each case positioned between the respective lashing or fixing means and the relevant object in the region of the deflection points, so the lashing or fixing means no longer directly touches the object but rests on the protective layer. The protective layer itself does not absorb any hold or fixing forces in the process, so it may be optimally formed solely with respect to its protective function. Damage to the lashing or fixing means, which may otherwise occur as a consequence of the unavoidable relative movements between lashing or fixing means and the object during tensioning of the lashing or fixing means or during transportation, may thus be prevented.

An example of a protective element of the type mentioned above is described in EP 1 103 652 A1. The lashing or fixing means disclosed there is surrounded in its sling region by the, in this case, tubular protective element, the width of which allows the lashing or fixing means to be freely pushed through the protective element. Comparable protective tubes are used in round slings to protect the carrier material, on the inside, of the respective lashing or fixing means against cuts and abrasion.

In practice the fact that the protective elements effectively guarantee the protection of the lashing or fixing means against abrasive wear but that during use the friction between the load-bearing lashing or fixing means and the protective element is very high at the deflection points has been found to be a problem in protective elements of the type described above. The consequence of this is that the forces absorbed or applied by the lashing or fixing means are not uniformly passed from one deflection point to the next, rather severe load jumps occur at the deflection points in the lashing or fixing means.

These load jumps are due to the fact that, despite the presence of a protective element, the lashing or fixing means may slide only poorly in the region of the deflection points.

When lifting objects the deficient sliding properties in the region of the deflection points lead to very uneven loading of the different sections of the respectively used lashing or fixing means. This can lead to the item that is to be lifted in each case jerkily changing its position in the respective lifting equipment if the effect of the weight increases so greatly that the obstruction acting beforehand in the region of the deflection points as a result of friction is suddenly overcome.

The non-uniformity of force transmission that is established in the region of the deflection points has been found to be particularly problematical, however, in lashing straps which are subjected to high tension forces in order to hold loads.

According to standard EN12195-1, which describes and regulates the use of lashing straps, a high tensioning loss is assumed in the case of deflection points. The relevant standard states that a loss of 50% of the tensioning between the side of the lashing strap, where the respectively used tensioning device is applied, and the opposing side of the lashed load must be reckoned with. This means that with a standardised tensioning force (called STF) applied to the tensioning device only half the value may be expected for the opposing side of the load. Practical experience has shown that the loss in tensioning between the two sides of the load can even be much higher (up to 80%). To keep the respective load secure on either side the lashing belt must therefore be tensioned with a particularly high force to ensure that sufficiently high forces are acting even downstream of the deflection points to guarantee secure retention of the load.

An attempt has been made to improve the uniformity of the loading of lashing or fixing means by using guides that are made from plastics materials or other materials with improved sliding properties for the lashing or fixing means instead of the textile protective elements in the region of the critical deflection points. One drawback in this case however is that guides of this type are usually dimensionally stable and consequently are suitable only for one specific application in each case.

Starting from the above-described prior art the object underlying the invention was to provide a protective element of the type described in the introduction which allows the advantages of the known protective elements based on a textile material to be used, but at the same time ensures improved force transmission in the region of the deflection points. A lashing or fixing means should also be provided which can apply the forces required to lift, fix or lash an object with more uniform loading over its length.

With respect to a protective element for textile lashing or fixing means for lifting, fixing or lashing objects, with a protective layer which is intended for arrangement between the lashing or fixing means and the respective object the above-disclosed object has been achieved according to the invention in that the protective layer is formed from a textile backing fabric which carries a textile material at least on its surface associated with the lashing or fixing means, the textile material, owing to its shaping, its arrangement and/or its material properties, in the state abutting the lashing or fixing means having different sliding properties to the backing fabric.

The invention combines the advantages of a protective element made from a textile woven, namely the ability to be applied to any desired shapes owing to the flexibility peculiar to the woven, with the advantages of guide elements which have improved sliding properties as a result of their material properties or shaping.

This is achieved according to the invention in that two actively connected textile elements are combined with each other. The backing fabric outwardly protects the lashing or fixing material from abrasive or cutting stress and simultaneously provides on its surface associated with the lashing or fixing means a structure through which a textile material that improves the sliding properties is securely positioned.

The improvement in the sliding properties attained through the textile material carried by the backing fabric can be brought about in that the material has shaping by means of which the respectively effective friction surface is minimised. There is thus lower friction overall between lashing or fixing means and protective element with a high protective action that is unchanged. The same effect can be achieved by way of a suitable arrangement of the textile material on the backing fabric. Finally the material properties of the textile material may also be selected such that, in particular in combination with the material of the respective lashing or fixing means, minimised friction and therefore facilitated sliding of the lashing or fixing means on the protective layer of the protective element is ensured.

The invention thus provides a protective element that reduces the friction at the deflection points of the lashing or fixing means to a minimum and ensures more uniform distribution of loading of the respective lashing or fixing means.

The above-stated object has therefore been achieved in relation to the lashing or fixing means in that lashing or fixing means of this type are provided with a protective element according to the invention.

The invention proves to be particularly advantageous if the protective element according to the invention is used on a fixing element which is used as a lashing belt for securing loads. The invention allows the user to pass the required tension force in the lashing belt to the deflection edges with minimised losses and thus implement efficient lashing. Tests have shown that when using protective elements constructed according to the invention the tension force losses that occur as a result of friction at the deflections of the lashing belt may be limited to values which are significantly below the losses achieved with conventional protective elements (up to 20%).

A particularly secure retention of the protective element on the respective lashing or fixing means may be ensured in that the protective element is tubular and in that the textile material carried by the backing fabric extends at least over a longitudinal section of the inner side of the protective element. Curing use the protective element constructed in such a way is aligned on the lashing or fixing means in such a way that the longitudinal section provided with the additional textile material comes to rest on the respective object.

Tubular protective elements according to the invention have the further advantage that they may be produced in a weaving technology-related manner and protect the lashing or fixing means across its total extent. Depending on the production means available it may be expedient in this connection for the textile material carried by the backing material to be arranged over the entire inner surface of the protective element. This also has the advantage that independently of how it comes to rest on the respective object the protective element provides an optimum sliding property. Optimised material utilisation results on the other hand if the arrangement of the textile material is limited to the region of the backing fabric which regularly abuts the relevant object when the lashing or fixing means is properly used.

The versatility of a protective element according to the invention may be improved in that it may be fastened to the respective lashing or fixing means in such a way that it is freely displaceable in the protective element.

According to a particularly robust and, with respect to the production engineering-related effort, advantageous configuration of the invention the textile material carried by the backing fabric is securely woven with the backing fabric. A protective element of this type may be produced in one operation and ensures a lastingly secure connection between the backing fabric and the textile material carried by it.

In principle the textile material carried by the backing fabric can be made from the same fibres as the backing fabric. This can be particularly sufficient if the improvement in the sliding property according to the invention is attained solely by a surface structure being created with the aid of the additional textile material on the backing fabric, of which surface structure the effective surface that abuts the lashing or fixing means is minimized with respect to friction.

A surface structure of this type is given for example if the textile material carried by the backing fabric forms elevations. In this case the protective element then comes into direct contact with the lashing or fixing means only in the region of the free peaks of the elevations. Particularly good sliding properties may be achieved with the formation of such elevations if the material carried by the backing fabric forms ribs extending in the longitudinal direction of the protective layer. These may also be produced particularly simply in terms of weaving technology. However it is also conceivable to produce a rhomboidal or comparable structure with narrow, web-like elevations on the backing fabric from the textile material carried by it, which structures also lead to a minimised friction surface and therefore reduced instances of friction.

In the case of particularly high loadings of the protective element, as occur for example when lashing sharp-edged objects, such as containers or boxes, to the loading area of a vehicle, the life and effectiveness of protective elements according to the invention may also be further increased in that the textile material carried by the backing fabric is made from high-strength fibres. It can be advantageous in this case to use a mixture of fibres as the textile material, of which mixture individual components are combined with each other in such a way that optimum properties with respect to friction behavior and strength are achieved. A textile material which is twisted can be used for this purpose.

Particularly good sliding properties result if the textile material carried by the backing fabric has a smoother surface than the backing fabric.

To ensure that constantly correct positioning of the protective elements according to the invention can be implemented even under harsh conditions of use, a marking can be woven into the backing fabric which indicates the position of the textile material carried by the backing fabric.

With particularly severe instances of abrasive loading of the outer surfaces of the protective element it may be expedient to apply an additional coating to these outer surfaces. If the protective element is placed around sharp edges the protective element should be combined with an additional cutting protector.

Figure 2:
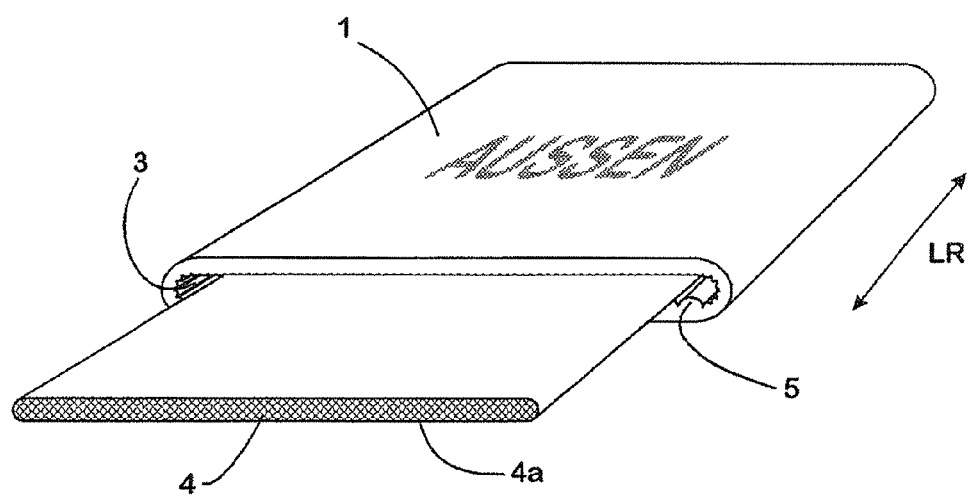
Figure 3:
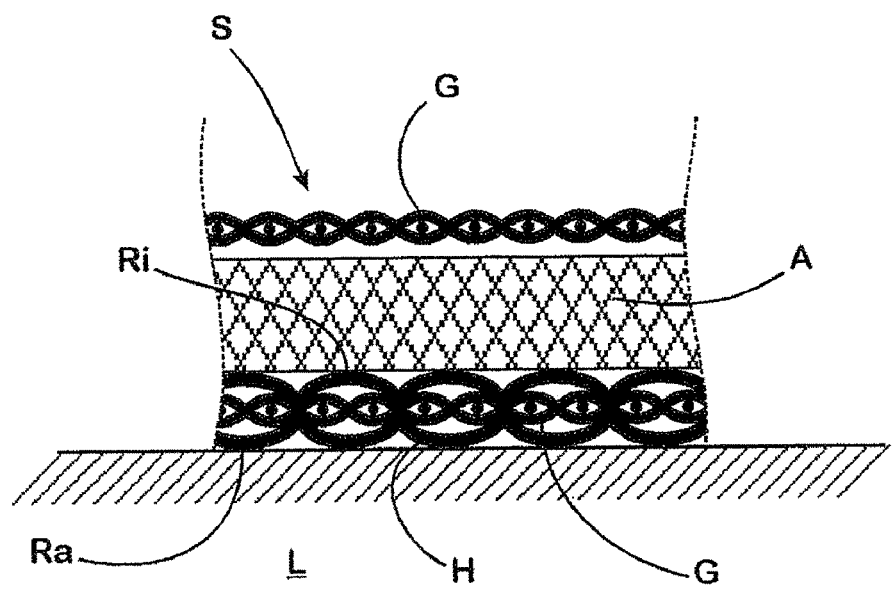

The invention will be described in more detail hereinafter with reference to drawings that illustrate an embodiment. In the drawings, schematically in each case:

FIG. 1. shows a protective element for a lashing means in a perspective view;

FIG. 2 shows a fixing with the protective element illustrated in FIG. 1 in a perspective view;

FIG. 3- to 6 each show details of a protective element fastened to a lashing means in cross-section.

The protective element 1 shown in FIGS. 1 and 2 is tubular. It comprises a backing fabric 2 woven to give a tube which forms the outer layer of the protective element 1 and is produced from textile fibres which are particularly abrasion-resistant and also reliably withstand instances of high abrasive loading, as occur during lashing of sharp-edged objects.

The protective element 1 defines an interior 3 which has an approximately rectangular form in cross-section. The height of the interior 3 is larger by a slight oversize than the thickness of the lashing means 4, for the protection of which the protective element 1 is used. The width of the interior 3 is also larger by an oversize than the width of the lashing means 4. The protective element S can thus be freely pushed over the lashing means 4 in the unloaded state.

The lashing means 4 is a flat and wide conventional lashing strap in this case, as is typically used to lash a load, not shown here, for example a skip or a comparably bulky container, to the loading area of a vehicle. The protective element 1 is placed with its one wide side 1a onto one of the edges of the load (not shown). This wide side 1a then forms the protective layer via which the lashing means 4 is directly protected against abrasive or cutting stress.

In the case of the protective element 1 the backing fabric 2 carries on the inner surface, associated with the interior 3, of the wide side 1a forming the protective layer ribs 5 that protrude into the interior 3 and extend in the longitudinal direction L of the protective element 1. The ribs 5 are formed by a textile material which is securely woven to the backing fabric 2.

High-strength fibres with a particularly smooch surface constitute the textile material forming the ribs 5. High-strength fibres of this type are supplied for example under the product name "Dyneema" by DSM Dynema BV, Heerlen, The Netherlands, or under the name "Vectran" by Celanese Acetate LLC, Charlotte, N.C., U.S.A. The material characteristics of these fibres are matched to the outer material of the lashing means 4 in such a way that the lashing means 4 can still slide on the ribs 5 with minimized friction even if there is high surface pressure between the ribs 5 and the outer surface 4a of lashing means 4 resting thereon in the tensioned state.

The backing fabric 3 can be made for example from polyester, polyamide or polypropylene.

To indicate to the user of the lashing means 4 provided with the protective element 1 which of the two wide sides 1a, 1b of the protective element 1 should be associated with the load to be fastened and which should be located on the outside in the lashed state, corresponding writing 6 is woven into the wide side 1b that is not provided with ribs.

FIG. 3 to 6 show various possibilities of how the textile material improving the sliding properties can be joined to the respective backing fabric G in such a way that the desired minimisation of friction between the respective lashing means A and the respective protective element S is achieved.

For this purpose in the embodiment shown in FIG. 3 a high-strength fibre H has been woven in a manner known per se into the backing fabric G in the side, facing the load L indicated in this figure, of the tubular protective element S as a weft thread in addition to the weft thread, made from an abrasion-resistant textile fibre, of the backing fabric G in such a way that the fibres H form ribs Ri, Ra that extend in the longitudinal direction of the protective element.

The inner ribs Ri stand on the inner surface of the wide side 1a of the protective element 1 which is associated with the interior of the protective element receiving the lashing means A, while the ribs Ra rise on the outer surface, associated with the load L, of the same wide side 1a of the protective element S. The fibres H carried by the backing fabric G and securely woven therewith thus on the one hand form linear sliding surfaces on the inner surface of the protective element 1, on which sliding surfaces the lashing means A can slide with reduced friction in the longitudinal direction of the protective element S, and on the other hand the ribs Ra formed on the outer side of the protective element S hand protect the protective element S from damage even in instances of high loading.

Figure 4:
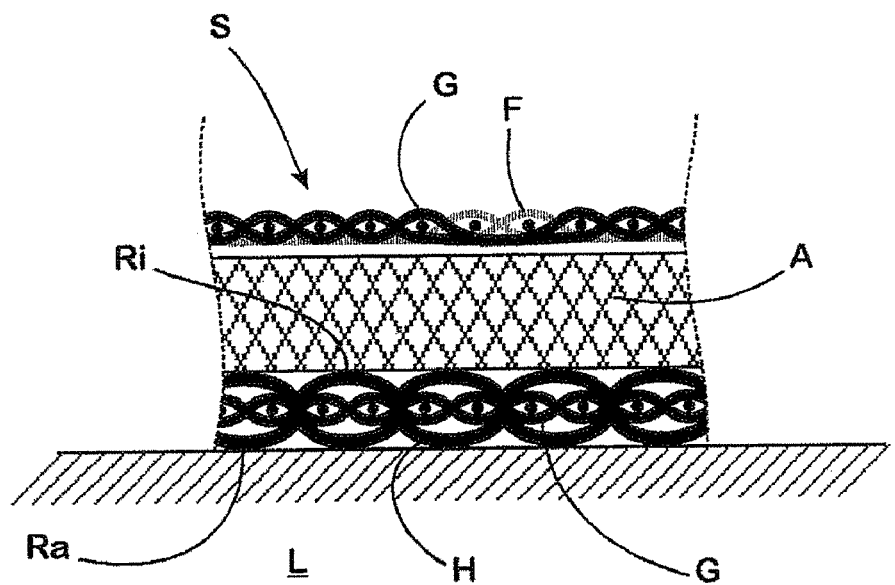

The protective element 1 shown in FIGS. 1 and 2 has for example a structure like the tubular protective element S shown in FIG. 4.

In the embodiment shown in FIG. 4 inner ribs Ri and outer ribs Ra are formed exactly as in the embodiment described above and shown in FIG. 3 on the wide side of the protective element S forming the protective layer by high-strength fibres H woven with the backing fabric G. Writing is also woven in fibres F of a different color into the backing fabric G on the opposing wide side of the slit element S, the writing indicating the position of the side of the protective element S without ribs that is to be arranged on the outside during use.

Figure 5:
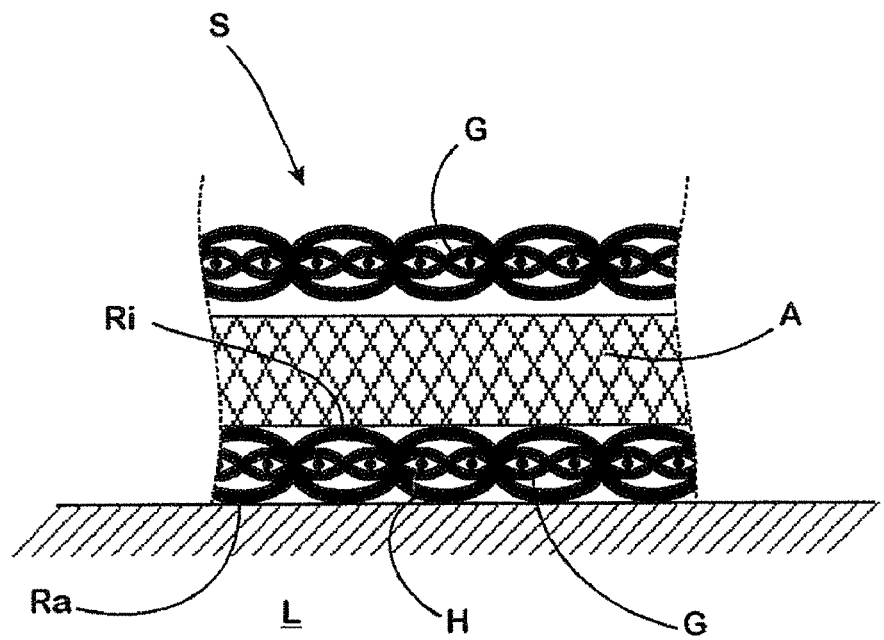

In the embodiment shown in FIG. 5 a distinction between the wide side associated with the load L and provided with ribs Ri, Ra and the wide side of the tubular protective element S that is to be arranged on the outside is not necessary. In this case ribs Ri, Ra are formed over the entire extent of the protective element S on the inner and outer sides thereof by the high-strength fibres H having been woven into the backing fabric G over the entire extent of the protective element S.

Figure 6:
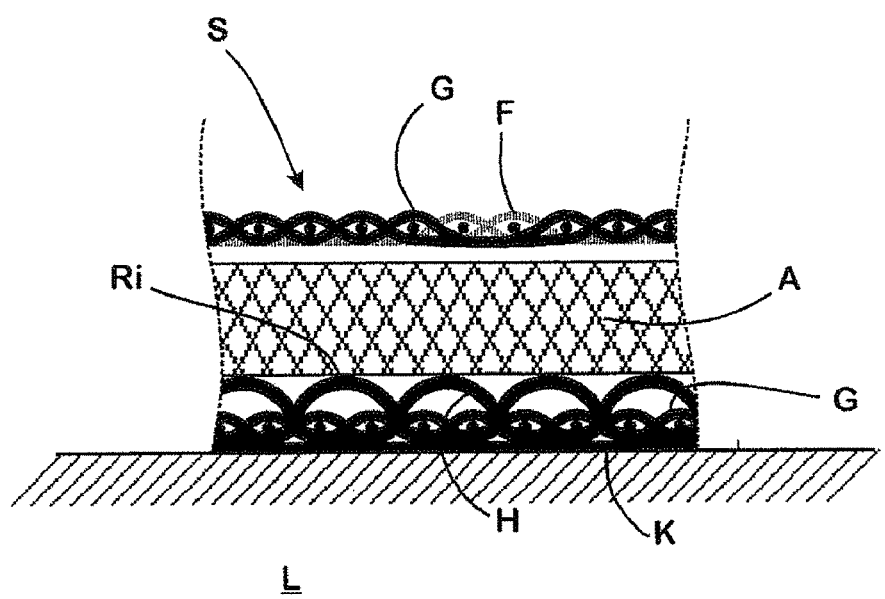

FIG. 6 finally shows an embodiment of a protective element S in which, corresponding to the embodiment shown in FIG. 4, the wide side, which is located on the outside during use, of the tubular protective element S is distinguished by writing woven into the backing fabric G by means of colored fibres F. Ribs Ri are also formed on the inner side of the wide side, associated with the load L, of the protective element by high-strength fibres H woven into the backing fabric G, on which ribs the lashing means A may slide. In contrast to the embodiment of FIG. 4 the high-strength fibres H have however been guided in such a way during weaving of this protective element S that no ribs are produced on the side of the protective element S associated with the load L. Instead the fibres H at this location lie flat in the backing fabric G. The protective element S shown in FIG. 6 can thus rest on the load L with a maximum supporting surface and thus provide optimised protection in particular against abrasive loading. To additionally improve the abrasion-resistance of the outer surface of the protective element S abutting the load L a protective layer K made from a resilient, abrasion-resistant plastics material is applied to this outer surface.

LIST OF REFERENCE NUMERALS

FIGS. 1, 2
1 protective element
1a, 1b wide sides of the protective element 1
2 backing fabric
3 interior of the protective element 1
4 lashing means
4a outer surface of the lashing means 4
5 ribs
6 Writing
LR longitudinal direction of the protective element 1
FIGS. 3 to 6
A lashing means
F coloured fibres
G backing fabric
H high-strength fibre
K protective layer
L load
Ri, Ra ribs
S protective element

The invention claimed is:

1. Protective element for textile lashing or fixing devices for lifting, fixing or lashing objects, comprising a protective layer which is intended for arrangement between the lashing or fixing device and the respective lifting, fixing or lashing object, wherein the protective layer is formed from a textile backing fabric which carries a textile material at least on its surface associated with the lashing or fixing device, the textile material being securely woven to the backing and which, owing to its shaping, its arrangement and/or its material properties, in the state abutting the lashing or fixing device having different sliding properties to the backing fabric.

2. Protective element according to claim 1, wherein the protective element is tubular and in that the textile material carried by the backing fabric extends at least over a longitudinal section of the inner side of the protective element.

3. Protective element according to claim 1, wherein the lashing or fixing device is freely displaceable in the protective element.

4. Protective element according to claim 1, wherein the textile material carried by the backing fabric is made from a high-strength fibre.

5. Protective element according to claim 4, wherein the textile material carried by the backing fabric is made from a mixture of fibres.

6. Protective element according to claim 1, wherein the textile material carried by the backing fabric is twisted.

7. Protective element according to claim 1, wherein the textile material carried by the backing fabric has a smoother surface than the backing fabric.

8. Protective element according to claim 1, wherein the textile material carried by the hacking fabric forms elevations on the backing fabric.

9. Protective element according to claim 8, wherein the textile material carried by the backing fabric forms ribs extending in the longitudinal direction of the protective element.

10. Protective element according to claim 1, wherein marking is woven into the backing fabric which indicates the position of the textile material carried by the backing fabric.

11. Lashing or fixing devices provided with a protective element constructed according to claim 1.

12. Lashing or fixing devices according to claim 11, wherein the lashing or fixing devices comprise a cable, belt, or strap.

13. Protective element according to claim 1, wherein the lasing or fixing device comprise a cable, belt, or strap.

* * * * *